US008936183B2

(12) United States Patent
Zack

(10) Patent No.: US 8,936,183 B2
(45) Date of Patent: Jan. 20, 2015

(54) UMBRELLA STROLLER STORAGE DEVICE

(75) Inventor: Elizabeth Zack, Brooklyn, NY (US)

(73) Assignee: Infantino, LLC, San Diego, CA (US)

(*) Notice: Subject to any disclaimer, the term of this patent is extended or adjusted under 35 U.S.C. 154(b) by 272 days.

(21) Appl. No.: 13/455,958

(22) Filed: Apr. 25, 2012

(65) Prior Publication Data

US 2012/0267405 A1    Oct. 25, 2012

Related U.S. Application Data

(60) Provisional application No. 61/478,810, filed on Apr. 25, 2011.

(51) Int. Cl.
*B60R 7/00*   (2006.01)
*B62B 9/26*   (2006.01)
*B62B 5/06*   (2006.01)

(52) U.S. Cl.
CPC .... *B62B 9/26* (2013.01); *B62B 5/06* (2013.01)
USPC ......................................... 224/409; 224/572

(58) Field of Classification Search
USPC ......... 224/409, 407, 411, 410, 401, 436, 437, 224/439, 901.8, 222, 221, 219, 572; 280/304.1; 135/66–68
See application file for complete search history.

(56) References Cited

U.S. PATENT DOCUMENTS

| 4,830,238 | A | * | 5/1989 | Widinski et al. ............ 224/572 |
| 4,974,760 | A | * | 12/1990 | Miller ......................... 224/407 |
| 5,513,789 | A | * | 5/1996 | Woods et al. ................ 224/407 |
| 5,743,650 | A | * | 4/1998 | Shannon et al. ............... 383/16 |
| 5,941,437 | A | * | 8/1999 | Okumura ..................... 224/585 |
| 6,942,130 | B1 | * | 9/2005 | Duva ........................... 224/407 |
| 7,036,699 | B1 | * | 5/2006 | Hay et al. ..................... 224/407 |
| 2002/0056736 | A1 | * | 5/2002 | Conte ........................... 224/407 |
| 2004/0056057 | A1 | * | 3/2004 | Dixon et al. ................... 224/409 |
| 2013/0249202 | A1 | * | 9/2013 | White et al. ................... 280/769 |

* cited by examiner

*Primary Examiner* — Brian D Nash
*Assistant Examiner* — Corey Skurdal
(74) *Attorney, Agent, or Firm* — Stetina Brunda Garred & Brucker

(57) ABSTRACT

Provided is an elastically expandable stroller storage device configured to be easily secured to a stroller frame to provide additional storage space particularly intended for essential items. The storage device is formed from an elastically expandable material, such as neoprene, that is stretched to dispose the device in tension and to wrap the device around the stroller frame. When the device is secured to the stroller frame, the tension within the storage device maintains the device in position on the stroller frame. As such, the storage device may be particularly suitable for umbrella strollers including a pair of frame members extending downwardly from the stroller handles. The device may be wrapped around the frame member to secure the storage device thereto, and to position the device in an easily accessible position for the parent.

17 Claims, 3 Drawing Sheets

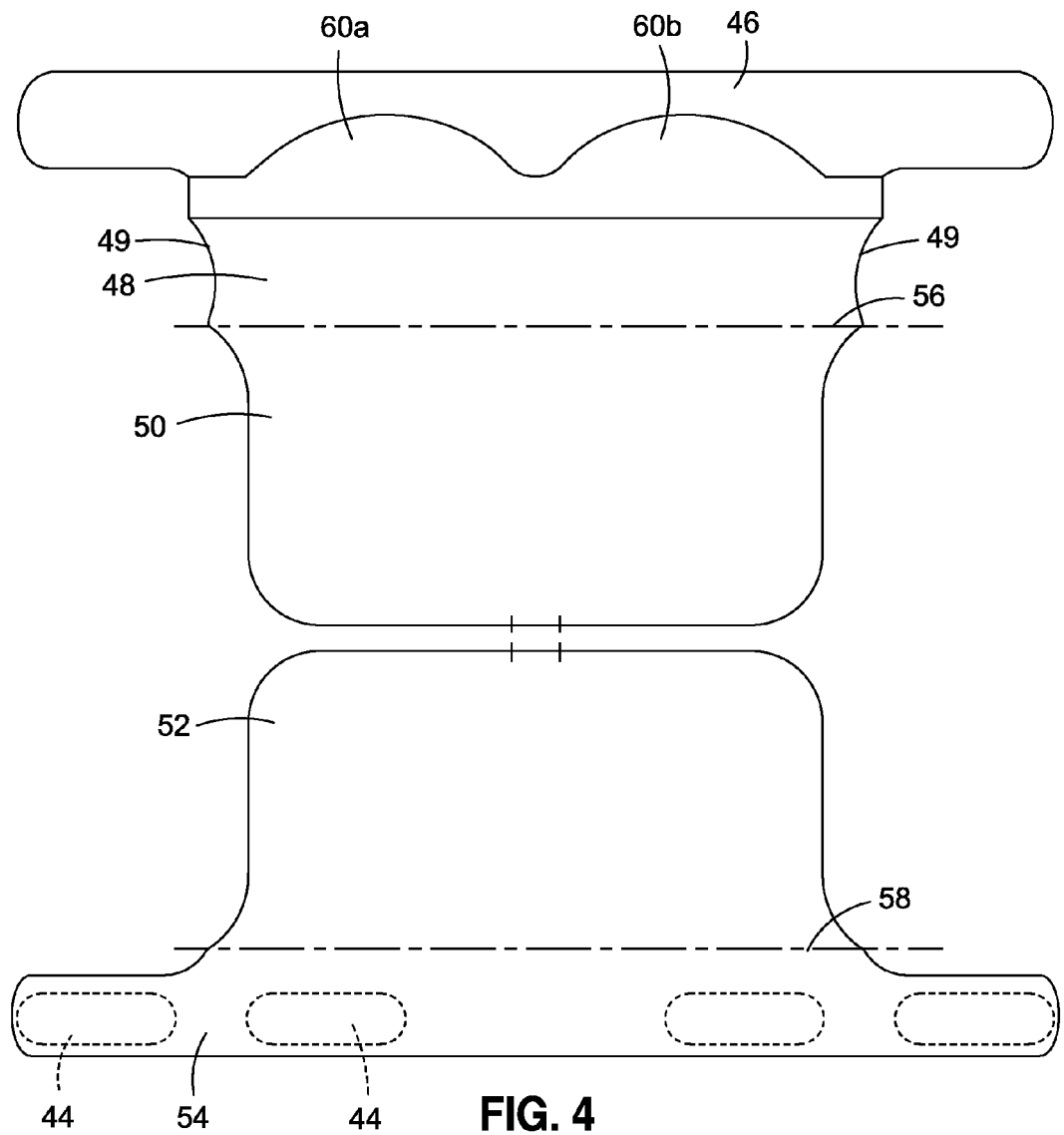
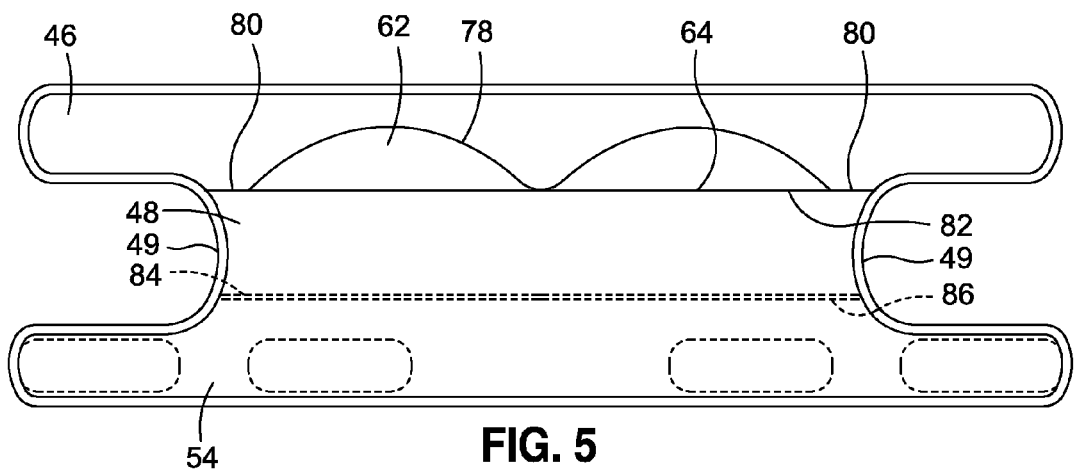

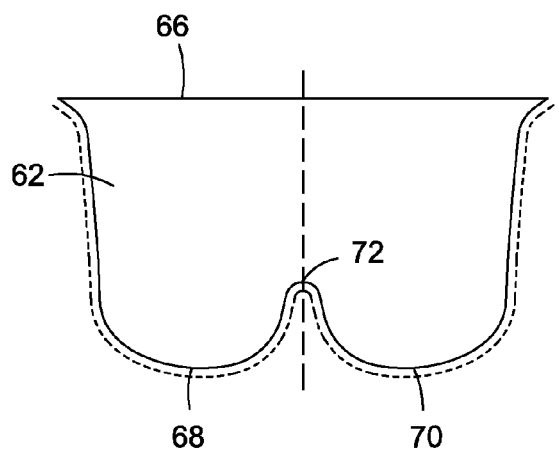 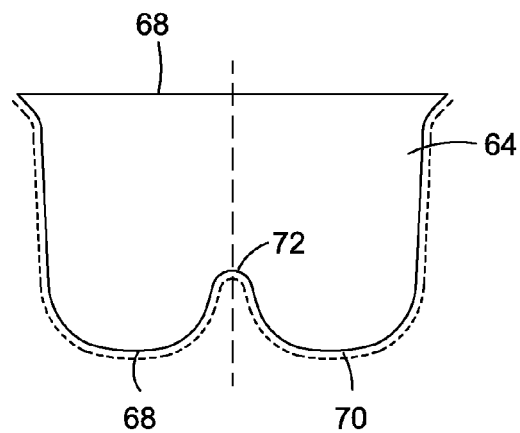
FIG. 6A  FIG. 6B

UMBRELLA STROLLER STORAGE DEVICE

CROSS-REFERENCE TO RELATED APPLICATIONS

This application claims the benefit of U.S. Provisional Application No. 61/478,810, filed Apr. 25, 2010, and entitled UMBRELLA STROLLER STORAGE DEVICE.

STATEMENT RE: FEDERALLY SPONSORED RESEARCH/DEVELOPMENT

Not Applicable

BACKGROUND OF THE INVENTION

1. Technical Field

The present invention relates generally to a supplemental storage device for a stroller, and more specifically, a stroller storage device configured to be elastically expandable to stretch around the stroller frame to dispose the storage device in tension to tightly secure the storage device along the stroller frame.

2. Related Art

Strollers are well known in the art for transporting children. Children typically enjoy riding in strollers because they can look out of the stroller and view the surrounding environment. Transporting a child in a stroller also eases strain on parents because the parent is not required to carry the child, which may be difficult as the child grows older and bigger. Thus, strollers are widely used as an easy and effective means of carrying a child.

There are several types of strollers made available to parents. For instance, strollers may be specifically configured for running to allow a parent to jog with the child seated within the stroller. A "jogging type" stroller may include larger wheels, as well as a single front wheel for ease of pushing the same.

Another type of stroller includes a stroller that is part of a "travel system" which not only includes the stroller, but also includes a corresponding infant car seat. In a travel system, the stroller and infant car seat are configured to cooperatively engage with each other to allow the infant car seat to be transitioned between a base within the vehicle to the stroller without having to remove the infant from the car seat. Strollers which comprise a portion of the above-described travel system tend to be slightly more cumbersome than some of the other strollers that are available because the travel system strollers include additional structures to support or engage with the infant car seat.

An alternative to the travel system type strollers or jogging strollers are "umbrella" strollers, which include a foldable frame and a fabric seating panel extending between the foldable frame. The frame is configured to easily transition between a stowed position and a deployed position. The stroller may be placed in the stowed position for storage within a vehicle, or other storage compartment, and when the parent desires to use the stroller, it can easily be unfolded into the deployed position to defining a seating area for the child. Furthermore, the simplistic design of umbrella strollers results in a lightweight stroller, particularly relative to the travel system strollers and jogging strollers discussed above. Therefore, the configuration of the umbrella strollers provides several advantages related to ease of use.

Unfortunately, one drawback that is commonly associated with umbrella strollers is that their simplistic design provides very little, if any, storage space. For instance, a conventional umbrella stroller generally does not include a space for the parent to place a wallet, drink, keys, or other day-to-day items. Furthermore, a parent oftentimes will carry an extra diaper, change of clothes, wipes, or other essential items for caring for the child. Therefore, the lack of storage space on conventional umbrella strollers makes it difficult for parents to acconodate certain essential items.

Moreover, the particular configuration of umbrella strollers makes it difficult to connect a separate storage device to the stroller. For instance, the frame of the umbrella strollers generally includes a pair of parallel bars that extend downwardly from a pair of handles which the parent grasps when pushing the stroller. Given the downward angle of the bars, storage devices which are merely wrapped around the bars tend to slide down along the bars, especially when weighted items, such as keys, a cell phone, or soft drink are loaded within the storage device.

Accordingly, there remains a need in the art for a storage device which may be easily connectable to a stroller, particularly an umbrella stroller, wherein the device is configured to remain secured to the stroller without sliding along the frame of the stroller.

BRIEF SUMMARY OF THE INVENTION

The present invention specifically addresses and alleviates the above-identified deficiencies in the art. There is provided an elastically expandable stroller storage device configured to be easily secured to a stroller frame to provide additional storage space for essential items, such as a cell phone, water bottle, baby bottle, keys, etc. The storage device is formed from an elastically expandable material, such as neoprene, that is stretched to dispose the device in tension and to wrap the device around the stroller frame. When the device is secured to the stroller frame, the tension within the storage device maintains the device in position on the stroller frame. As such, the storage device may be particularly suitable for umbrella strollers including a pair of frame members extending downwardly from the stroller handles. The device may be wrapped around the frame member to secure the storage device thereto, and to position the device in an easily accessible position for the parent, i.e., near the stroller handles.

According to one embodiment, the stroller storage device includes a first connector portion and a second connector portion disposed in spaced relation to the first connector portion. A main body portion is disposed between the first connector portion and the second connector portion and includes one or more pockets.

The present invention is best understood by reference to the following detailed description when read in conjunction with the accompanying drawings.

BRIEF DESCRIPTION OF THE DRAWINGS

These as well as other features of the present invention will become more apparent upon reference to the drawings wherein:

FIG. 4 is a top view of a first connector panel, intermediate panel, second connector panel, intermediate pocket panel, and second connector pocket panel;

FIG. 5 is a top view of the stroller storage device in a detached configuration; and FIGS. 6A and 6B are front views of a first connector pocket panel and a first intermediate pocket panel, respectively.

Common reference numerals are used throughout the drawings and detailed description to indicate like elements.

DETAILED DESCRIPTION OF THE INVENTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1:
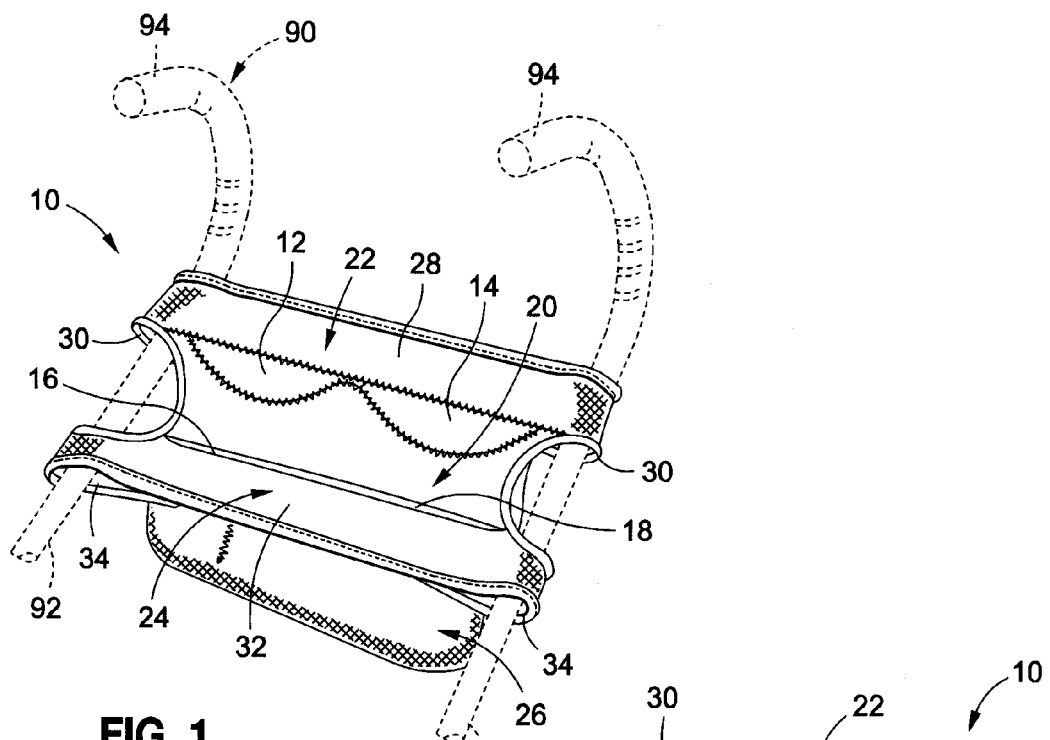
FIG. 1 is an upper perspective view of an elastically expandable stroller storage device.
Figure 2:
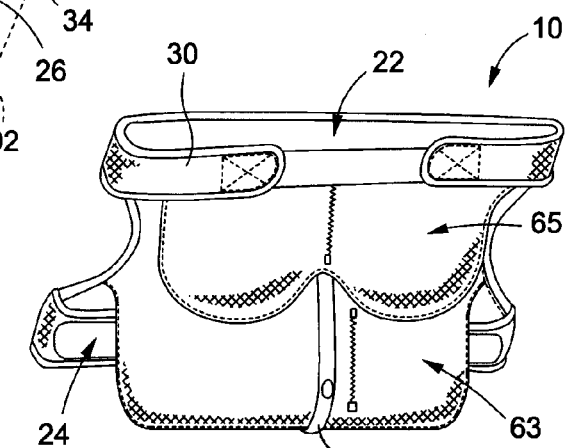
FIG. 2 is a lower perspective view of the stroller storage device depicted in FIG. 1.

Referring now to FIGS. 1 and 2, there is shown an embodiment of a storage device 10 specifically configured to be selectively attachable to a stroller to provide additional storage space on the stroller. The device 10 wraps around the frame of the stroller to be secured thereto, and includes one or more pockets or pouches to provide storage space for a parent/caregiver. For instance, the parent may place keys, a cell phone, baby bottle, or other essential items with the pocket(s). The storage device 10 is formed from an elastically stretchable material, such as neoprene, to allow the device 10 to stretch around the frame of a stroller and attach to itself to secure the device 10 to the stroller. When the device 10 is stretched, it is disposed in tension to create a tight, secure fit to the frame of the stroller to reduce any likelihood that the device 10 would move relative to the stroller frame. The device 10 may be particularly suitable for use with umbrella strollers, wherein the device 10 may be attached to the frame members (i.e., rails) extending from the stroller handles (See FIG. 1). The expandable nature of the device 10 allows the device 10 to stretch between the frame members and to tightly wrap around the frame members to secure the device 10 in place.

The device 10 shown in FIGS. 1 and 2 includes four pockets 12, 14, 16, 18, wherein pockets 12, 14 are positioned in a side-by-side arrangement to define a first pair of pockets, and pockets 16, 18 are spaced from pockets 12, 14 and are also arranged in side-by-side arrangement to define a second pair of pockets. FIG. 1 is a front upper perspective view of the device 10 showing the pocket openings formed within an upper panel 20 of the device 10 and FIG. 2 is a rear lower perspective view of the device 10 showing the depth of the pockets 12, 14, 16, 18 extending from the upper panel 20.

The device 10 further includes a first connector portion 22, a second connector portion 24 and a main body portion (i.e., storage body) 26 disposed between the first connector portion 22 and the second connector portion 24. The first and second connector portions 22, 24 engage with the stroller frame to secure the device 10 to the stroller, while the main body portion 26 includes the pockets 12, 14, 16, 18 which hang from the stroller frame when the device 10 is connected to the stroller.

The first connector portion 22 includes a first medial portion 28 and a pair of first lateral portions 30 disposed on opposite ends of the first medial portion 28. The first connector portion 22 is selectively transitional between an attached configuration, wherein each first lateral portion 30 is folded back toward the first medial portion 28 to connect to itself and define a looped configuration, and a detached configuration, wherein each first lateral portion 30 is detached from the attached configuration to allow each lateral portion 30 to extend laterally outwardly from the first medial portion 28. The first connector portion 22 shown in FIGS. 1 and 2 is in the attached configuration.

The second connector portion 24 includes a second medial portion 32 and a pair of second lateral portions 34 disposed on opposite ends of the second medial portion 32. The second connection portion 24 is selectively transitional between an attached configuration, wherein each second lateral portion 34 is folded back toward the second medial portion 32 to connect to itself and define a looped configuration, and a detached configuration, wherein each second lateral portion 34 is detached from the attached configuration to allow each lateral portion 34 to extend laterally outwardly from the second medial portion 32. The second connector portion 24 shown in FIGS. 1 and 2 is shown in the attached configuration.

Figure 3:
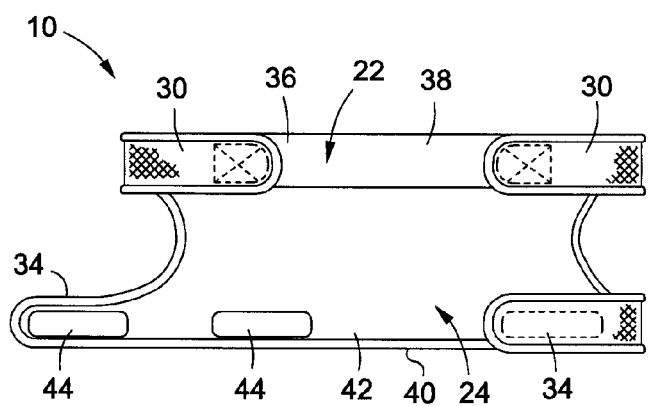
FIG. 3 is a bottom view of the stroller storage device having three attachment portions in an attached configuration and one attachment portion in a detached configuration.

Referring now to FIG. 3, there is shown a bottom view of the device 10. Please note that FIG. 3 does not show the pockets 12, 14, 16, 18. Rather, FIG. 3 is intended to provide an additional perspective of the first and second connector portions 22, 24 and to illustrate their respective attached configurations and detached configurations. In particular, the first connector portion 22 is shown with both first lateral portions 30 in the attached configuration, while the second connector portion 24 is shown with one second lateral portion 34 in the attached configuration, with the other second lateral portion 34 being in the detached configuration.

Referring still to FIG. 3, the first connector portion 22 may include a first, upper face 36 and an opposing second, lower face 38. Likewise, the second connector portion 24 may include a first, upper face 40 and an opposing second lower face 42. The lower faces 38, 42 may include mechanical fasteners 44 which allow the lateral portions 30, 34 to be disposed in the attached positions. For instance, the mechanical fasteners 44 may include complimentary hook and loop fasteners, snap fasteners, buttons, magnetic strips, or other mechanical fasteners known by those skilled in the art. The mechanical fasteners 44 may also be configured to allow for selectively adjustment of the lateral portions 30, 34 in the attached configuration. For instance, the device 10 includes strips of complimentary hook and loop material to allow each lateral portion 30, 34 to be disposed in the attached configuration. The degree of overlap of the complimentary strips may be selectively adjusted by the user to adapt and conform the device 10 to the particular size of the stroller which the device 10 is connected to. If buttons or other types of mechanical fasteners are used, the device may include an array of fasteners to allow the user to selectively adjust the fasteners, as needed.

Those skilled in the art will appreciate that although the first and second connector portions 22, 24 are shown as being configured to wrap around a stroller frame and engage with the "bottom" or "lower side" of the connector portions 22, 24, other embodiments may include first and second connector portions 22, 24 which wrap around the stroller frame to connect with the "top" or "upper side" of the connector portions 22, 24.

The device 10 is formed of a stretchable, elastic fabric configured to dispose the device 10 in tension as the fabric is stretched. In this regard, the fabric may be biased toward an "unstretched" state. According to a preferred embodiment, the device 10 is formed from neoprene, although other fabrics known by those skilled in the art may be used without departing from the spirit and scope of the present invention. The device 10 is configured to be stretched along a "stretch axis"

which extends in a direction that is parallel to the longitudinal dimension of the first and second connector portions 22, 24.

Referring now to FIGS. 4-6, one embodiment of the device 10 is comprised of a plurality of fabric panels that are connected to each other to collectively define the storage device 10. The fabric panels may be sewn, welded, glued, or fastened via other means which are known by those skilled in the art.

FIG. 4 includes a first connector panel 46, an intermediate panel 48, a second intermediate pocket panel 50, a second connector pocket panel 52, and a second connector panel 54. The first connector panel 46 defines the first connector portion 22 and the second connector panel 54 defines the second connector portion 24. The second intermediate pocket panel 50 and the second connector pocket panel 52 collectively define the pockets 16, 18. The intermediate panel 48 extends between the pockets 12, 14 and the pockets 16, 18. In the embodiment depicted in FIG. 4, the intermediate panel 48 and the second intermediate pocket panel 50 are integrally formed from a single piece of fabric, with the intermediate panel 48 and the second intermediate pocket panel 50 being separated by fold line 56. Similarly, the second connector panel 54 and the second connector pocket panel 52 shown in FIG. 4 are also formed from a single piece of fabric and are separated by fold line 58. However, it is understood that the intermediate panel 48, the second intermediate pocket panel 50, the second connector pocket panel 52 and the second connector panel 54 may be formed from separate, individual pieces of fabric that are joined together.

The first connector panel 46 is an elongate panel which defines the first medial portion 28 and the pair of first lateral portions 30. The first lateral portions 30 include rounded ends, although other configurations may include ends that are square or ends that define another configuration. The first connector panel 46 additionally includes a pair of cutouts 60a, 60b which correspond to the first and second pockets 12, 14. Although the cutouts 60a, 60b are shown in FIG. 4 as being formed within the first connector panel 46, it is understood that the cutouts 60a, 60b may alternatively be formed within the intermediate panel 48.

The intermediate panel 48 extends between the pockets 12, 14, and 16, 18 in one direction and substantially between the pair of first lateral portions 30 in another direction. The intermediate panel 48 may have opposed lateral edges 49 (see FIG. 5) that define an acruate, concave configuration to provide a transition between the first lateral portions 30 and the second lateral portions 34. Furthermore, the arcuate, concave configuration of the lateral edges 49 may accommodate the frame members of the stroller.

The second intermediate pocket panel 50 and the second connector pocket panel 52 are substantially complimentary in shape and are connected along their peripheral edges to collectively define a secondary pocket body 63 (see FIG. 2) including the pockets 16, 18.

The second connector panel 54 is similar in configuration to the first connector panel 46 in that it is an elongate panel which defines the second medial portion 32 and the pair of second lateral portions 34. The exemplary second lateral portions 34 shown in FIG. 4 define rounded ends, although other shapes and configuration may be defined.

The panels 46, 48, 50, 52, 54 are each stretchable in a stretch direction, as indicated in FIG. 4. In this regard, each panel 46, 48, 50, 52, 54 may be stretched to tightly wrap the device 10 around the frame of a stroller. The stretch direction is substantially parallel to the longitudinal axis defined by the first connector panel 46 and the second connector panel 54.

Referring now specifically to FIGS. 6A and 6B, there is shown a first connector pocket panel 62 and a first intermediate pocket panel 64 which are complimentary to each other. The first connector pocket panel 62 and the first intermediate pocket panel 64 are connected to each other to define a primary pocket body 65 (see FIG. 2) including the pockets 12, 14. The first connector pocket panel 62 defines an upper edge 66 which is connected to the first connector panel 46 adjacent the cutouts 60a, 60b. The first intermediate pocket panel 64 also defines an upper edge 68 that is connected to the intermediate panel 48.

The panels 62, 64 are configured to define a pair of pocket ends 68, 70 corresponding to the pockets 12, 14, respectively. The pocket ends 68, 70 define the deepest portion of the pockets 12, 14 and are separated by raised section 72. The pockets 12, 14 may also be separated by a stitch 76 that extends in a direction substantially aligned with the raised section 72.

According to one embodiment, the panels 62, 64 are connected to each other by stitching adjacent the peripheral edges of the panels 62, 64. Those skilled in the art will appreciate that the panels 62, 64 may be joined via adhesives, welding, or by other mechanical fastening means known by those skilled in the art.

Referring now to FIG. 5, there is shown a top view of the device 10 with the various panels connected to each other to collectively define the device 10. In particular, the first connector panel 46 is connected to the first connector pocket panel 62 along seam 78. The first connector panel 46 may also be connected to the intermediate panel 48 along seam 80. The first intermediate pocket panel 64 is connected to the intermediate panel 48 along seam 82. The intermediate panel 64 is connected to the second intermediate pocket panel 50 along seam 84 (shown in phantom). The second connector pocket panel 52 is connected to the second connector panel 54 along seam 86 (shown in phantom).

Referring now to FIG. 1, the device 10 is shown in the attached configuration and is securely coupled to an umbrella stroller 90, shown in phantom. The stroller 90 includes a pair of frame members 92 (i.e., rails) that extend from the stroller handles 94. Each first lateral portion 30 is wrapped around a respective one of the pair of frame members 92 adjacent the handles 94 and is secured to the underside of the device 10. Likewise, each second lateral portion 34 is wrapped around a respective one of the pair of frame members 92 in spaced relation to the first lateral portions 30, and is secured to the underside of the device 10. The first and second connector portions 22, 24 are pulled tightly before the lateral portions 30, 34 are secured to the underside of the device 10 to dispose the first and second connector portions 22, 24 in tension. Consequently, the first and second connector portions 22, 24 are tightly wrapped around the frame members 92 to reduce the likelihood of the device 10 sliding downwardly along the frame members 92. It is additionally contemplated that the underside of the lateral portions 30, 34 that engage with the stroller handles 94 may be fitted with an anti-slip material, such as rubber, to further mitigate any inadvertent sliding of the device 10 along the frame members 92.

When the device 10 is secured to the stroller 90, the parent has easy access to the pockets 12, 14, 16, 18 to store items such as water bottles, baby bottles, cell phones, keys, or other essential items. Furthermore, the material used to form the device 10 may have insulating qualities to keep refreshments, such as bottled water, at their desired temperature.

As shown in FIG. 1, the pockets hang between the frame members 92 when the device 10 is connected to the stroller 90. The device 10 may be fitted with a connecting strap 96 to connect pockets 12, 14 to pockets 16, 18.

When the device is not in use, it may be configured to be easily folded or rolled into a compact configuration for easy storage and transport.

Additional modifications and improvements of the present invention may also be apparent to those of ordinary skill in the art. Thus, the particular combination of components and steps described and illustrated herein is intended to represent only certain embodiments of the present invention, and is not intended to serve as limitations of alternative devices and methods within the spirit and scope of the invention.

What is claimed is:

1. A storage device for use with a stroller having a pair of frame members, the storage device comprising:
   a resilient first connector engageable with the pair of frame members, the first connector including a pair of opposed lateral portions stretchable in opposing directions to dispose the first connector in tension, each lateral portion being configured to engage with a respective one of the pair of frame members when the first connector is in tension;
   a resilient second connector spaced from the first connector and engageable with the pair of frame members, the second connector including a pair of opposed laterals portions stretchable in opposing directions to dispose the second connector in tension, each lateral portion being configured to engage with a respective one of the pair of frame members when the second connector is in tension; and
   a storage body connected to and disposed between the first and second connectors, the storage body defining at least one pocket and including an upper panel defining an opposed pair of lateral edges, each of which has a concave arcuate configuration to provide clearance for the pair of frame members when the first and second connectors are engaged therewith.

2. The storage device recited in claim 1, wherein the first connector includes a medial portion disposed between the pair of opposed lateral portions, the storage device further including a first fastening member connected to a first one of the lateral portions and a second fastening member connected to the medial portion, the first and second fastening members being cooperatively engageable to connect the first one of the lateral portions of the medial portion to define a looped configuration about a respective one of the pair of frame members.

3. The storage device recited in claim 2, wherein the first and second fastening members are complimentary hook and loop fasteners.

4. The storage device recited in claim 3, wherein the second connector includes a medial portion disposed between the pair of opposed lateral portions, the storage device further including a third fastening member connected to a second one of the lateral portions and a fourth fastening member connected to the medial portion, the third and fourth fastening members being cooperatively engageable to connect the second one of the lateral portions of the medial portion to define a looped configuration about a respective one of the pair of frame members.

5. The storage device recited in claim 1, wherein the storage body includes a first pair of pockets disposed adjacent the first connector.

6. The storage device recited in claim 5, wherein the storage body further includes a second pair of pockets disposed adjacent the second connector.

7. The storage device recited in claim 1, wherein the storage body further includes a primary pocket body connected to the upper panel and the first connector and defining a first pocket.

8. The storage device recited in claim 7, wherein the primary pocket body includes a first panel, a second panel, and a seam joining the first and second panels to define the first pocket and a second pocket.

9. The storage device recited in claim 8, wherein the storage body further includes a secondary pocket body connected to the upper panel and the second connector and defining a third pocket.

10. The storage device recited in claim 9, wherein the storage body further includes a strap connecting the primary and secondary pocket bodies.

11. A storage device for use with a stroller having a pair of frame members, the storage device comprising:
    a first elastic strap having a pair of opposed end portions, each end portion being connectable to a respective one of the pair of frame members by wrapping around the respective frame member to define a looped configuration;
    a second elastic strap disposed in spaced relation to the first elastic strap, the second elastic strap including a pair of opposed end portions, each end portion being connectable to a respective one of the pair of frame members by wrapping around the respective frame member to define a looped configuration;
    a storage body including an upper panel extending between the first and second elastic straps and disposable between the pair of frame members, the upper panel defining an opposed pair of lateral edges which each have a concave, arcuate configuration to provide clearance for the pair of frame members when the first and second elastic straps are connected thereto, the storage body defining a pocket for storing possessions of a user.

12. The storage device recited in claim 11, wherein the first elastic strap is disposable in tension when the pair of opposed end portions are connected to respective ones of the pair of frame members.

13. The storage device recited in claim 12, wherein each end portion may be cinched in the looped configuration to increase the tension in the first elastic strap to mitigate movement of the first elastic strap relative to the pair of frame members.

14. The storage device recited in claim 11, wherein the storage body includes a first pair of pockets disposed adjacent the first elastic strap.

15. The storage device recited in claim 14, wherein the storage body further includes a second pair of pockets disposed adjacent the second elastic strap.

16. The storage device recited in claim 11, wherein the storage body further includes a primary pocket body connected to the upper panel and the first elastic strap and defining a first pocket.

17. The storage device recited in claim 16, further comprising a second elastic strap connected to the storage body in spaced relation to the first elastic strap, wherein the storage body further includes a secondary pocket body connected to the upper panel and the second elastic strap and defining a second pocket.

* * * * *